US007353463B2

(12) United States Patent

Stohrer et al.

(10) Patent No.: US 7,353,463 B2

(45) Date of Patent: Apr. 1, 2008

(54) INTERFACE FOR MULTIFUNCTIONAL SYSTEM HAVING MULTIPLE SERVICES

(75) Inventors: Charles W. Stohrer, Rochester, NY (US); Anne E. Brose, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 10/309,685

(22) Filed: Dec. 4, 2002

(65) Prior Publication Data

US 2004/0111164 A1 Jun. 10, 2004

(51) Int. Cl.
*G06F 3/048* (2006.01)

(52) U.S. Cl. .................................................... 715/827

(58) Field of Classification Search ................ 715/739, 715/827

See application file for complete search history.

(56) References Cited

U.S. PATENT DOCUMENTS

| | | | | |
|---|---|---|---|---|
| 4,937,762 | A * | 6/1990 | Todome | 358/1.2 |
| 5,506,657 | A * | 4/1996 | Ito et al. | 399/411 |
| 5,565,964 | A * | 10/1996 | Tashiro et al. | 399/83 |
| 5,657,461 | A * | 8/1997 | Harkins et al. | 715/733 |
| 5,687,297 | A | 11/1997 | Coonan et al. | 395/102 |
| 5,717,439 | A * | 2/1998 | Levine et al. | 715/835 |
| 5,726,883 | A * | 3/1998 | Levine et al. | 700/83 |
| 5,872,569 | A * | 2/1999 | Salgado et al. | 715/764 |
| 5,877,746 | A * | 3/1999 | Parks et al. | 345/156 |
| 6,069,624 | A | 5/2000 | Dash et al. | 345/333 |
| 6,100,994 | A * | 8/2000 | Schliekelmann et al. | 358/1.15 |
| 6,308,023 | B1 * | 10/2001 | Nomura et al. | 399/81 |
| 6,353,482 | B1 * | 3/2002 | Abe et al. | 358/1.15 |
| 6,438,975 | B1 * | 8/2002 | De Graaf | 62/127 |
| 6,470,155 | B1 * | 10/2002 | Martin et al. | 399/81 |
| 6,473,196 | B2 * | 10/2002 | Usami et al. | 358/1.18 |
| 6,477,341 | B2 * | 11/2002 | Nomura et al. | 399/81 |
| 6,606,465 | B2 * | 8/2003 | Mutoh et al. | 399/81 |
| 6,609,162 | B1 * | 8/2003 | Shimizu et al. | 710/15 |
| 6,795,663 | B2 * | 9/2004 | Kato | 399/81 |
| 6,834,387 | B2 * | 12/2004 | Jeyachandran et al. | 709/207 |
| 6,850,995 | B1 * | 2/2005 | Shishizuka et al. | 710/20 |
| 6,862,104 | B2 * | 3/2005 | Yajima et al. | 358/1.15 |
| 6,891,647 | B2 * | 5/2005 | Konno | 358/497 |
| 2001/0035983 | A1 * | 11/2001 | Abe | 358/468 |
| 2002/0049873 | A1 * | 4/2002 | Mikuni et al. | 710/73 |
| 2005/0286094 | A1 * | 12/2005 | Han et al. | 358/474 |

* cited by examiner

*Primary Examiner*—David A. Wiley
*Assistant Examiner*—Le Nguyen
(74) *Attorney, Agent, or Firm*—Oliff & Berridge, PLC

(57) ABSTRACT

An interface for a multifunctional electronic device capable of performing multiple services such as copy, fax, scan, and print wherein the interface is simplified by illuminating or otherwise focusing a user's attention to only those control switches that are available for selection in respect to the service to be performed. Also, provision may be made to highlight, within a group of available features, the switch that controls the feature that is currently selected.

26 Claims, 7 Drawing Sheets

INTERFACE FOR MULTIFUNCTIONAL SYSTEM HAVING MULTIPLE SERVICES

FIELD OF THE INVENTION

The present invention relates to control panels for electronic equipment and more particularly to control panels for multi-functional printers. Embodiments of the present invention simplify human interfaces with complex apparatus by directing attention to function buttons that relate to the service of a multifunctional system that has been selected.

BACKGROUND AND SUMMARY

As electronic devices become more complex by combining multiple functions that previously were typically the primary function of separate devices, user interfaces need to make available to users each of the control buttons or switches that enable users to make choices with respect to each of the separate functions. In many devices, this leads to control panels with many buttons or switches. The number of such control buttons and switches can often confuse users, and at a minimum decreases the desired simplicity of an interface.

In response, a number of devices have attempted to simplify complex interfaces. In expensive systems such as high end multifunctional printers, many of the user commands have been transferred to a flat panel touch screen display. See, e.g., U.S. Pat. No. 6,069,624 issued to Dash et al. In such multifunctional systems, a user first selects the basic service to be utilized, i.e., copy, scan, fax, or print. Internal software then determines which control features are available for such service, and accordingly displays touch screen buttons or similar control switches corresponding to such service. Commands that are unavailable or irrelevant to the selected service are not displayed or are shaded to indicate their inapplicability. In this manner, interface clarity and relative simplicity are enhanced.

Flat panel touch screen displays are expensive items, however, and to date large displays with more than a few character lines have been limited to relatively high-end devices. A typical prior art alternative has been to provide as many buttons as necessary for each of the services provided by the device. The result is a plethora of buttons. FIG. 1 shows a typical prior art example of a multifunctional printer interface. Similar examples can be found in some telecommunication, medical, and audio/visual equipment. A recent phenomena is the possible convergence of personal computer and television devices, and such a convergence may result in comparably complex and confusing arrangements of buttons.

In order to minimize the confusion from complex interfaces such as shown in FIG. 1, a number of techniques have been utilized. In one technique, all buttons relating to a particular service are grouped together, e.g., all buttons relating to a copy function are in one area of a display, and all buttons relating to a facsimile service are in a different area of the display. This partial solution, however, causes two problems: First, some buttons are usually duplicated since some of the same functions are provided for multiple services. As a result, a strict grouping of buttons within different areas of a display dedicated to each particular service results in even more buttons than would otherwise be needed. Although the result may in fact simplify the user's functional interface, the appearance increases the initial perception of complexity and confusion. Secondly, more buttons increases both material cost and manufacturing cost due to the need for increased logic, parts, and electrical connections.

In a second technique to deal with complex interfaces, buttons that are unique to the various services are grouped according to their respective service but buttons that relate to multiple services are either grouped in yet a separate area or are arranged around the display in a manner intended to draw attention to the control button when most needed. This second technique is demonstrated by the typical interface shown in FIG. 1. The advantage of this second technique is minimization of buttons, and, accordingly, cost and initially perceived complexity. As shown in FIG. 1, however, the disadvantage is that a user must search different portions of the interface to find all of the buttons that may relate to the service being performed. Worse, for multifunctional devices that perform more than 2 services, certain buttons may relate to a plurality of services but not to all. The result is that a user must expend valuable time understanding the machine, its interface, and the various specialized features available for the various services.

Yet a third technique for dealing with complex interfaces is to hide specialized control buttons under covers of various sorts. While this solution appears to make the interface simpler and, for routine tasks, probably succeeds in functional simplicity, a user that in fact wishes to utilize more esoteric functions must open the cover and encounter the type of confusion described above.

Another manner in which some interfaces attempt to focus a user's attention is by use of illumination or human interpretable signals. Examples include illumination of buttons on cellular telephones and certain medical equipment that is typically located in darkened environments. Such illumination, however, is not "intelligent" in the sense that all control buttons are illuminated rather than those that may be particularly applicable at moments in time. An exception to the above occurs in respect to some ON/OFF buttons. In some home audio/visual equipment, ON/OFF buttons are always illuminated in order to direct a user's attention. Similarly, buttons related to fault or alarm parameters often are designed to blink in order to immediately draw a user's attention to the fault. This blinking alarm arrangement, sometimes coupled with sound, is particularly common when a fault indicates an emergency situation that requires rapid attention.

It would be desirable to design an interface that simplifies human interactions and that helps focus a user's attention upon the control features that are most likely to be available and of use to the user for the service that has been selected.

In one embodiment of the present invention, a multifunctional electronic system having a human interface and offering a plurality of services to a human user is provided, said system comprising: (a) a system controller; (b) a plurality of human controllable switch devices located on the interface that control selection of system features and that separately communicate with the system controller; (c) a plurality of human interpretable indicators, each associated with a switch device and indicating the existence of one of a plurality of modes for such switch device; wherein, when a first service is selected, the controller directs the human interpretable indicator associated with a switch device to indicate the existence of a first mode for such switch device; and wherein, when a second service is selected, the controller directs the human interpretable indicator associated with the switch device to indicate the existence of a second mode for such switch device.

Another embodiment of the present invention provides for an electrophotographic multifunctional printer having a human interface and offering a plurality of services to a human user, said printer comprising: (a) a system controller; (b) a plurality of human controllable switch devices located on the interface that control selection of system features and that separately communicate with the system controller; (c) a plurality of human interpretable indicators, each associated with a switch device and indicating the existence of one of a plurality of modes for such switch device; wherein, when a first service is selected, the controller directs the human interpretable indicator associated with a switch device to indicate the existence of a first mode for such switch device; and wherein, when a second service is selected, the controller directs the human interpretable indicator associated with the switch device to indicate the existence of a second mode for such switch device.

Yet another embodiment of the present invention provides, in a multifunctional system having a system controller, a human interface comprising a plurality of switch devices that control selection of system features, and a human interpretable indicator associated with each switch device, a process for interfacing with the system, comprising: selecting a first service to be performed; determining, with the controller, which features are available for selection with the first service; and activating, with signals from the controller, the human interpretable indicators associated with those switch devices that control selection of the features available for selection with the first service.

DESCRIPTION

Figure 1:
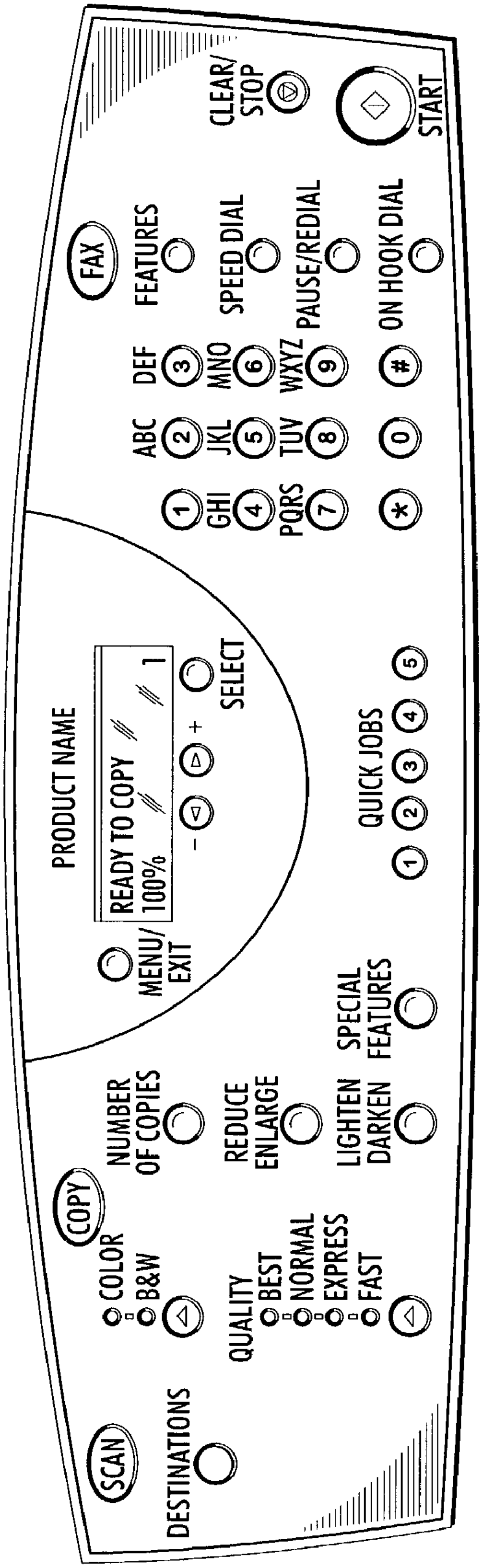
FIG. 1 PRIOR ART
FIG. 1 is an elevated perpendicular view of an interface of the prior art.

For a general understanding of the present invention, reference is made to the drawings. In the drawings, like reference numerals have been used throughout to designate identical elements.

An exemplary electronic system comprising one embodiment of the present invention is a multifunctional printer with print, copy, scan, and fax services. Such multifunctional printers are well known in the art and may comprise print engines based upon ink jet, electrophotography, and other imaging devices. The general principles of electrophotographic imaging are well known to many skilled in the art. Generally, the process of electrophotographic reproduction is initiated by substantially uniformly charging a photoreceptive member, followed by exposing a light image of an original document thereon. Exposing the charged photoreceptive member to a light image discharges a photoconductive surface layer in areas corresponding to non-image areas in the original document, while maintaining the charge on image areas for creating an electrostatic latent image of the original document on the photoreceptive member. This latent image is subsequently developed into a visible image by a process in which a charged developing material is deposited onto the photoconductive surface layer, such that the developing material is attracted to the charged image areas on the photoreceptive member. Thereafter, the developing material is transferred from the photoreceptive member to a copy sheet or some other image support substrate to which the image may be permanently affixed for producing a reproduction of the original document. In a final step in the process, the photoconductive surface layer of the photoreceptive member is cleaned to remove any residual developing material therefrom, in preparation for successive imaging cycles.

The above described electrophotographic reproduction process is well known and is useful for both digital copying and printing as well as for light lens copying from an original. In many of these applications, the process described above operates to form a latent image on an imaging member by discharge of the charge in locations in which photons from a lens, laser, or LED strike the photoreceptor. Such printing processes typically develop toner on the discharged area, known as DAD, or "write black" systems. Light lens generated image systems typically develop toner on the charged areas, known as CAD, or "write white" systems. Embodiments of the present invention apply to both DAD and CAD systems. Since electrophotographic imaging technology is so well known, further description is not necessary. See, for reference, e.g., U.S. Pat. No. 6,069,624 issued to Dash, et al. and U.S. Pat. No. 5,687,297 issued to Coonan et al., both of which are hereby incorporated herein by reference.

Figure 2:
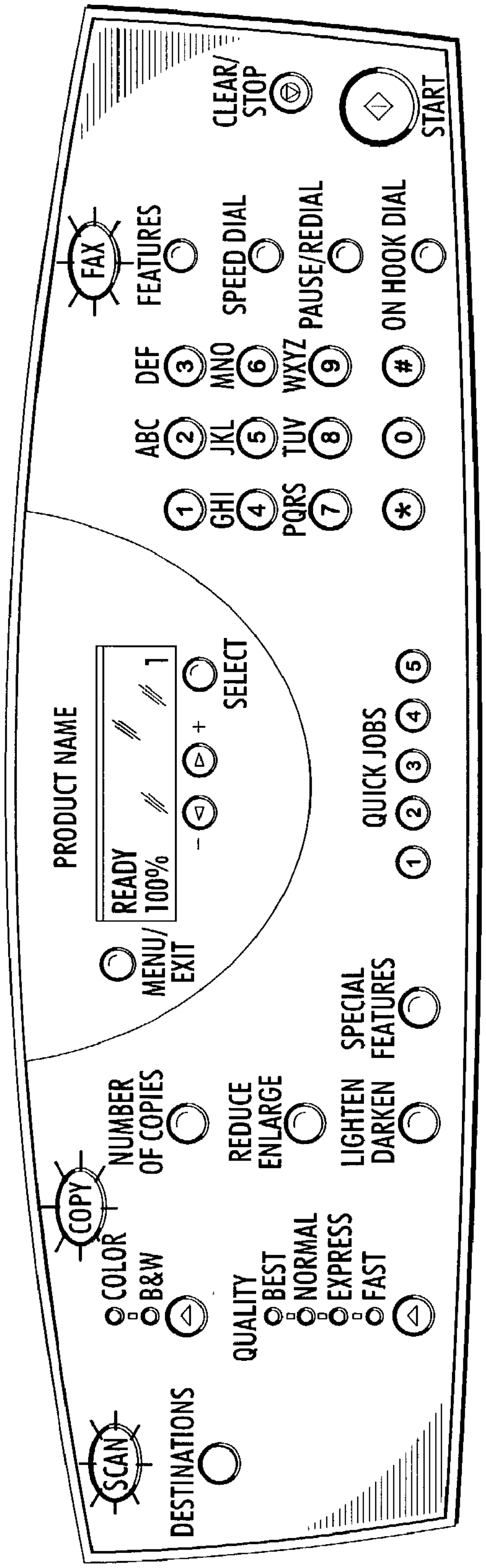
FIG. 2 is an elevated perpendicular view of one embodiment of an interface of the present invention.

With reference to FIG. 2, one embodiment of the interface of the present invention is shown. In this embodiment, an interface similar to the interface of FIG. 1 is shown for a multifunctional printer. The available services for this system are "SCAN", "COPY"; AND "FAX", together with "Print" which is controlled by one or more remote terminals. In the embodiment shown in FIG. 2, only the 3 buttons for selecting a primary service are illuminated. This embodiment represents one possible initial condition of the interface prior to selection of a desired service. In this embodiment, a walk-up user first sees that only the 3 serivce identifier lights are illuminated. The user then selects which service is desired, and the control devices (buttons) associated with the selected service become illuminated. Examples of such associated buttons are shown in relation to FIGS. 3-5.

Figure 3:
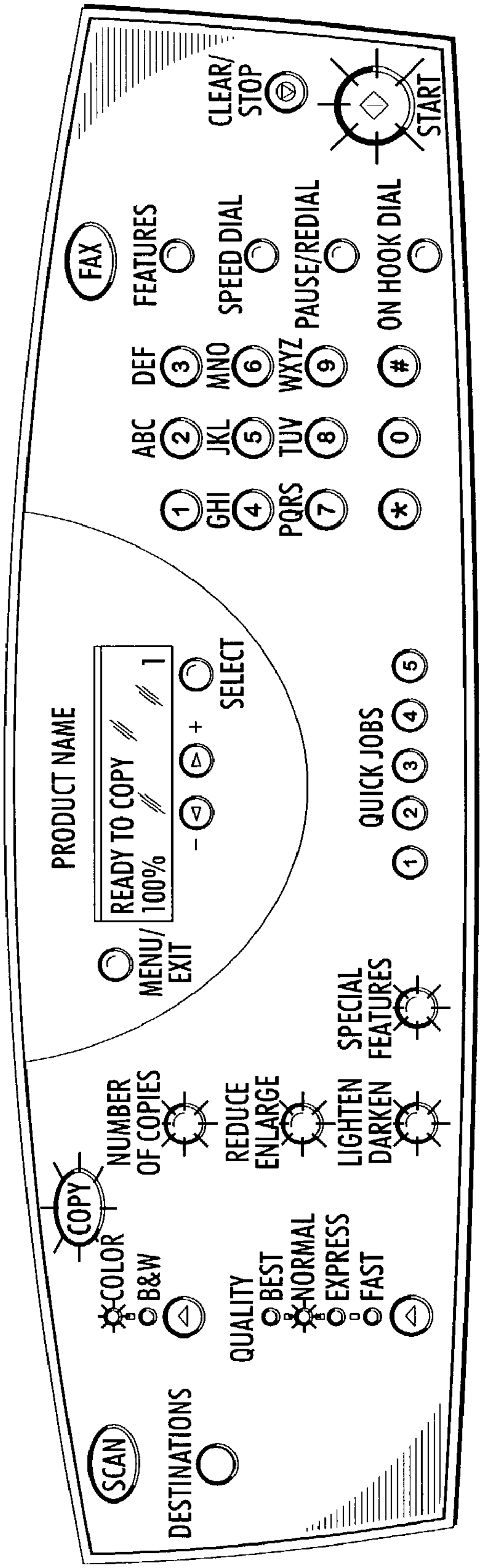
FIG. 3 is an elevated perpendicular view of another embodiment of an interface of the present invention.

With reference to FIG. 3, another possible initial configuration of the interface is shown. In this embodiment, the system is configured with an assumption that a walk-up user is most likely to choose the "COPY" service. The interface is thus configured, typically after a specified time after prior use, to display a chosen default configuration useful for the "COPY" service. The "COPY" button itself is illuminated to inform the user that the COPY service is currently available. Buttons available for use with the COPY service are illuminated to show their availability for control of features associated with the COPY service. Only one of the "COLOR" and "B&W" buttons are illuminated to indicate which mode is the default selection. Similarly, only one of the Quality group comprising choices: "BEST", "NORMAL", "EXPRESS" and "FAST" are illuminated. In each case, however, the close physical association of these alternate control choices are believed sufficient to indicate to a user that any of the group may be selected.

Figure 4:
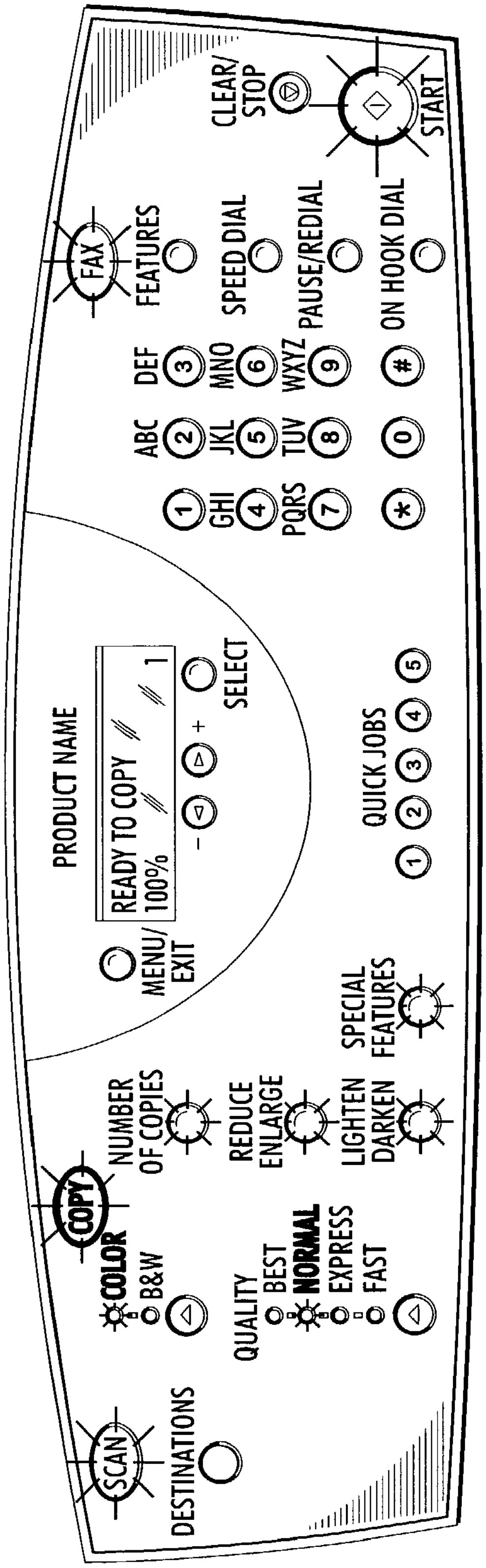
FIG. 4 is an elevated perpendicular view of another embodiment of an interface of the present invention.

A variation of the default configuration shown in FIG. 3 is shown in FIG. 4. In this Figure, the COPY service is again selected as a default selection. In this configuration, however, all of the control devices available for user selection are illuminated. In addition to the "Copy" button, both the "SCAN" and "FAX" buttons are illuminated. To indicate that the COPY service is the default selection, however, a secondary human detectable indicator is applied to the "COPY" button. This secondary indicator is represented in FIG. 4 by the bolded lettering of the "COPY" button. In one embodiment of this highlight feature, the selected feature button is highlighted with brighter illumination than non-selected functions. In another embodiment, the control device associated with the selected feature blinks to indicate its selection. Other cues can include, without limitation, changes in color, illumination of neighboring letters associated with the button, or any other visual, auditory or other human detectable sensory signal differentiating the selected button from others in its group. An embodiment of the highlighted letters is shown in relation to the groupings of "COLOR" AND "B&W" buttons and the various Quality buttons. In each instance, the letters associated with a selected button are themselves illuminated. The combination of the various levels of illumination or highlighting serves to indicate all of the control devices that are available for selection while at the same time indicate which of the available buttons are currently selected. In this manner, a user can quickly determine if the currently selected choices are desirable, and, if not, can readily see and identify the choices that are more preferred.

Figure 5:
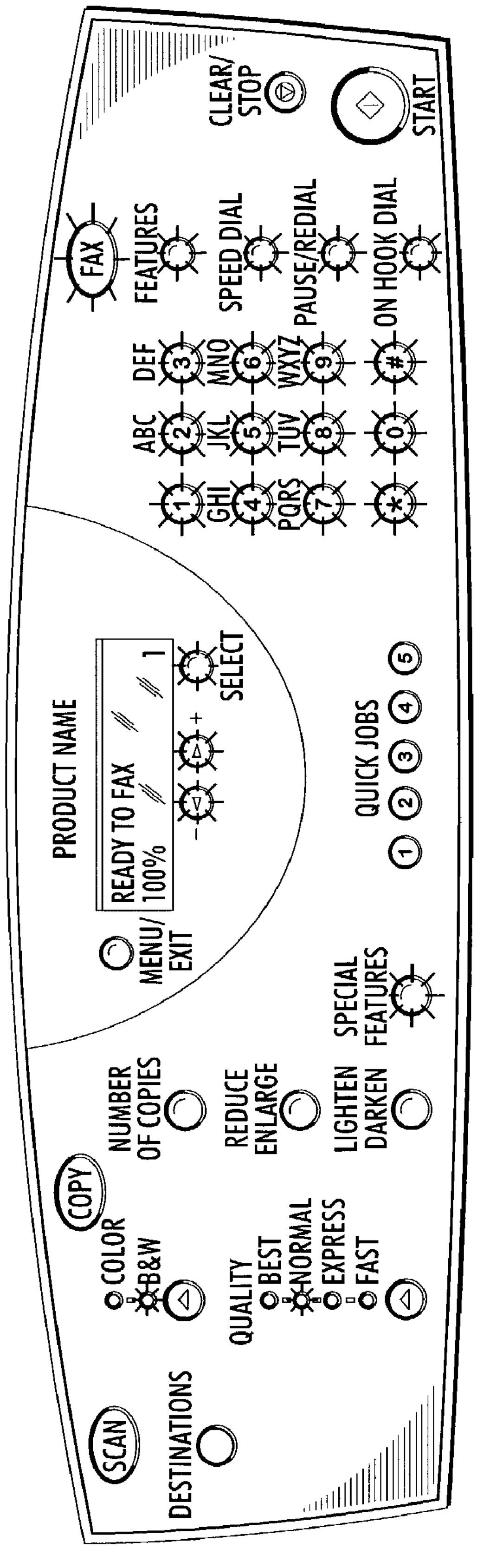
FIG. 5 is an elevated perpendicular view of one embodiment of an interface of the present invention.

Similar default interface presentations can also be configured for each service that is selected. For instance, FIG. 5 shows a possible interface configuration once the Fax service has been selected. Note that in this configuration, the "START" button is not illuminated because phone numbers have not yet been entered. The "START" button is therefore unavailable. As with the COPY service, multiple levels of highlighting can be employed to both inform a user which switches are available and which are selected at a particular time.

Another embodiment of the present invention contemplates an interactive interface. Once a user has made an initial selection or is ready to accept the initial default configuration for a system, then pressing the "START" button typically commences processing by the system and implementation of the selected features. Once "START" is pushed, then many control buttons become unavailable for alteration while system processing continues. For instance, once the "START" button is selected, illumination is ceased for buttons such as the Quality and the Color or Black and White selections. In contrast, some features such as the "CLEAR/STOP" function may become available once system processing of a service begins. A change in illumination for this button may indicate this change in status.

A particular problem with prior art interfaces having "hard displays" such as shown in FIG. 1 is user confusion over use of the "START" button. Specifically, experience shows that many non-expert users attempt to begin processing of their requested service by re-pressing the service selection button (e.g., "COPY", "FAX", or "SCAN" button) rather than the "START" button. Yet another embodiment of the present invention is to draw a user's attention to the "START" control switch after a user has made selections of service and/or features that may indicate that the job is ready for processing. Such highlighting may comprise a change from no illumination to illumination or commencement of another human detectable indicator. Since the START function in a configuration such as shown in FIG. 3 typically is ready for activation in a default configuration, another embodiment may be to increase the level of illumination, blink, or otherwise draw particular attention once a user has altered the default configuration in a manner that is again ready for processing.

The above embodiments of the present invention may be implemented using any human detectable indicator to attract attention to available functions and thereby simplify complex "hard interfaces". If Illumination is chosen, then a typical form of illumination may be LEDs located under translucent buttons or letters. Other alternatives include fiber optics that transport light from one or a few light sources to the buttons or other control switches. Whichever human detectable indicator is used, however, a means for switching such indicator on and off and a controller with an appropriate control algorithm typically implements the interactiveness between user input and highlight variations in the display.

Figure 6:
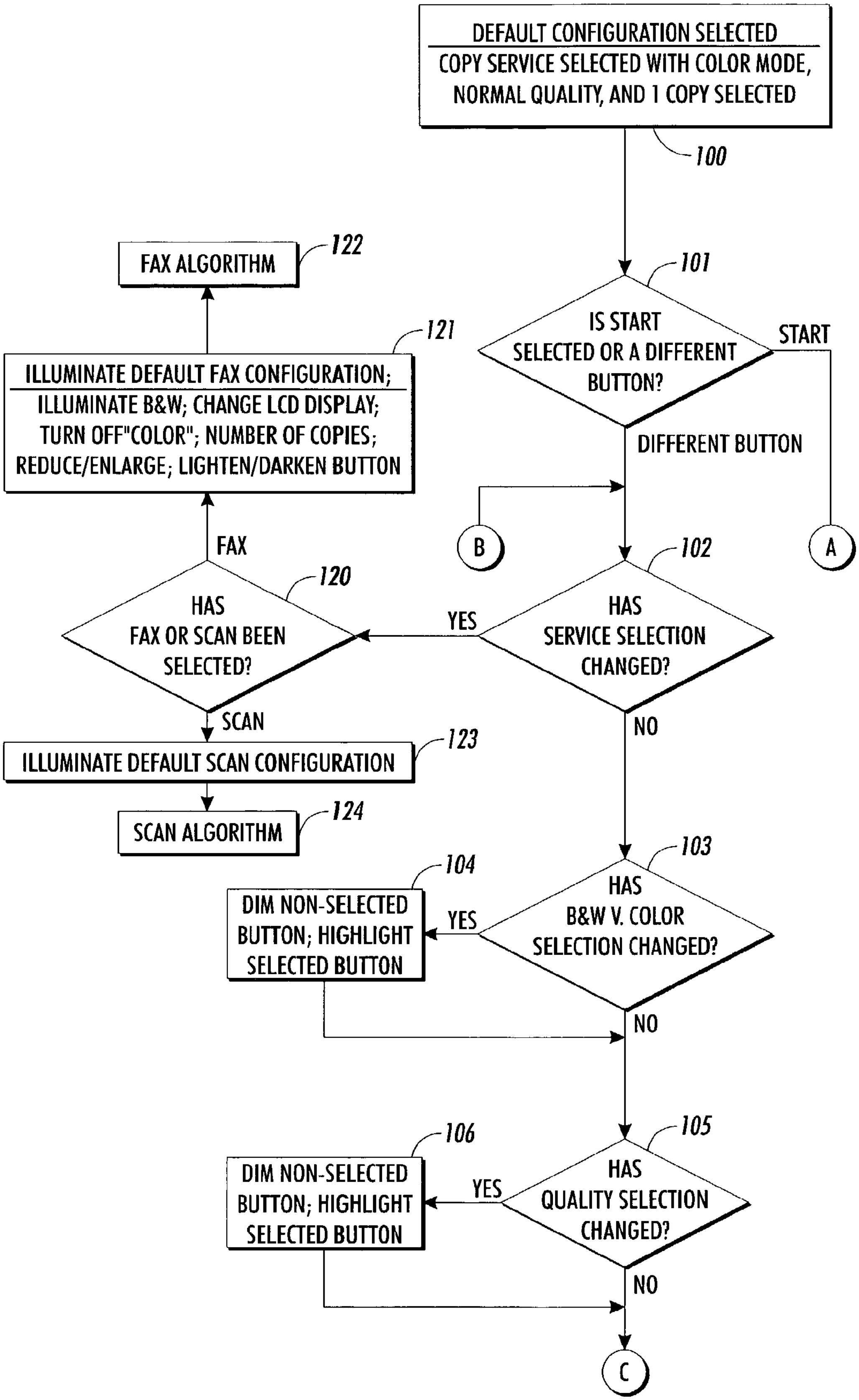
FIG. 6 is the first part of a flow chart setting forth a logic algorithm for an embodiment of the present invention.
Figure 7:
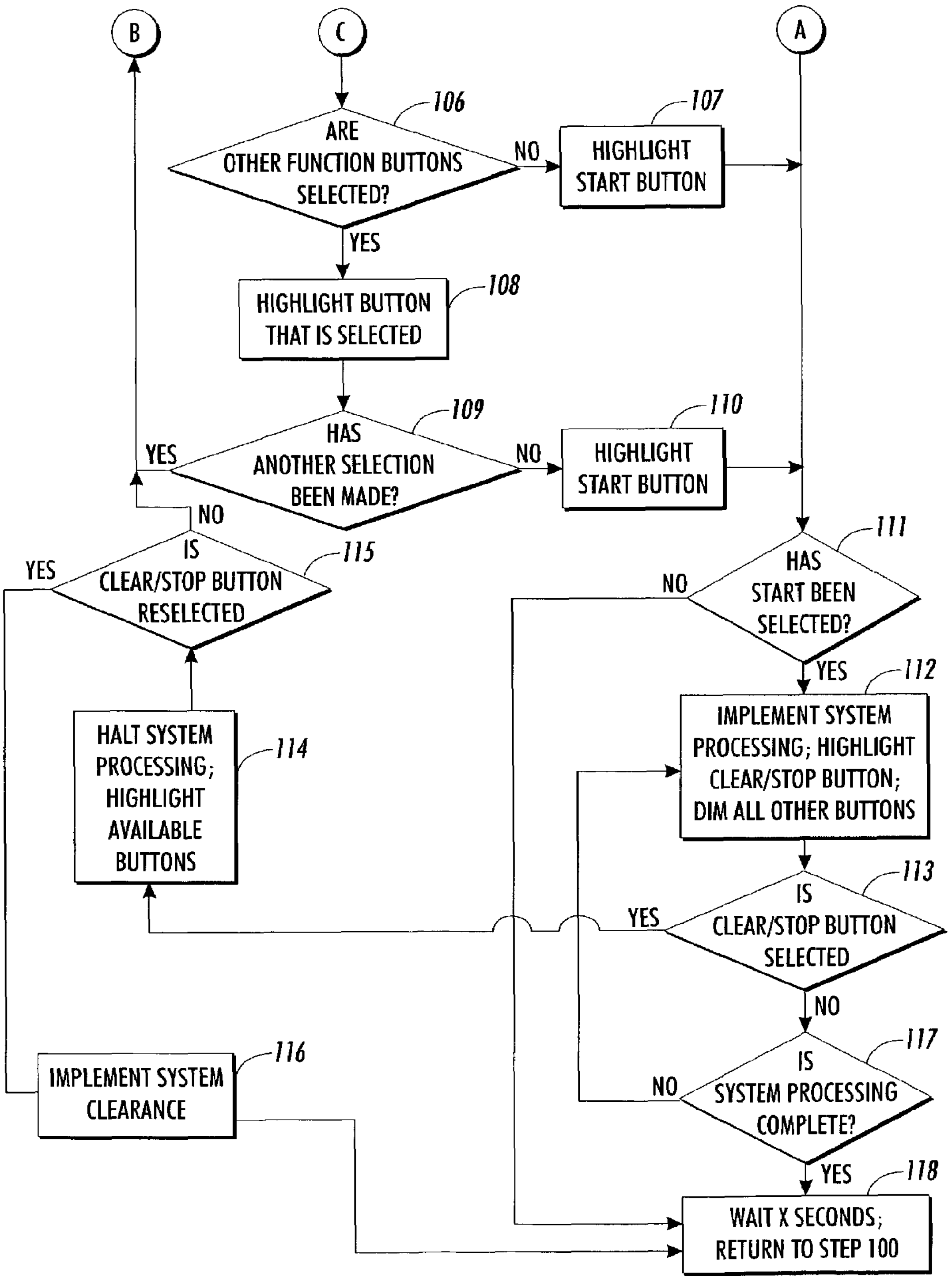
FIG. 7 is the second part of a flow chart setting forth a logic algorithm for an embodiment of the present invention.

One possible embodiment of a controller algorithm is set forth in the flow chart shown in FIGS. 6 and 7. This embodiment roughly corresponds to the display shown in FIG. 4. Beginning at step 100, the display configuration begins with the System Default configuration, which also is the Copy service default configuration. At step 101, the algorithm responds to the user either pressing "START" or sensing that a different button is selected. At 102, the algorithm determines whether selected button indicates a change in service. If so, then the algorithm proceeds to step 120, wherein the display is reconfigured into either the Fax service or the Scan service default configuration as indicated in steps 1121-124. Those skilled in the art will recognize that the particular algorithms for Fax and Scan are analogous to the algorithm for the Copy service, and detailed explanation of these algorithms will therefore be easily understood without further description.

Returning to step 102, if the Copy service remains selected, then at step 103, the algorithm inquires whether the Color or B&W mode has changed. If so, then at step 104, the illumination for each is switched. The algorithm then proceeds to step 105, wherein the algorithms inquires whether the Quality selection has changed. If so, the newly selected button is highlighted and the previous button is dimmed. The algorithm then proceeds to step 106, wherein the algorithm inquires whether any function buttons have been selected. If no, then at step 107, the "START" button is highlighted, and the algorithm inquires at step 111 whether the "START" button is activated. If the answer at step 106 is "yes", then at step 108, the button that is selected is highlighted. At step 109, the algorithm inquires whether another button has been selected. If yes, the algorithm returns to step 102 and repeats the above process steps. If no, then the "START" button is highlighted. If the "START" button is selected at step 111, then the system controller is directed to implement the then current system configuration and to begin system processing as shown in step 112. During system processing, the "CLEAR/STOP" button is highlighted and all other illuminations are dimmed. At step 113, the algorithm inquires whether the "CLEAR/STOP" button has been activated during processing. This inquiry typically continues until system processing is complete. If the "CLEAR/STOP" button is activated, then at step 114, system processing is paused or stopped. The system control algorithm implements the appropriate commands to place the system is a safe paused condition, and the interface algorithm waits until a next command is received. All buttons that relate to functions that can then be selected are re-illuminated as well as the "CLEAR/STOP" button. If the next command is a re-selection of the "CLEAR/STOP" button at step 115, then the algorithm proceeds to step 116, where the system controller directs tasks necessary to end the job and return the system to its initial condition. Such tasks may include, for instance, expulsion of any sheets that are in-process at the time the system was halted. Once such tasks have been completed, the interface algorithm proceeds to step 118, where it waits a specified period of time and then returns to step 100 where the process may be initiated again.

Returning to step 113, if the "CLEAR/STOP" button is not activated, then system processing proceeds until completion or system process interruption such as a paper jam. A system interruption may generally be treated as a first activation of the "CLEAR/STOP" button at step 113. Assuming no such system process interruption occurs, then at step 117, the algorithm inquires whether processing is complete. When complete, the system proceeds to step 118 where it waits a specified time and returns to the initial interface configuration of step 100.

There is at least one additional manner by which the algorithm may reach step 118. Returning to step 111, if the "START" button is not activated within a specified time, then the algorithm proceeds to step 118 and reconfigures the interface and system as provided in step 100.

Those skilled in the art will recognize that many variations are possible upon the above described interface control algorithm, and all such variations are intended to be encompassed within the present invention.

In sum, an improved and simplified interface for multifunctional electronic systems having "hard displays" is presented wherein human detectable indicators such as illumination are used to highlight and guide users to only those buttons relating to system functions that available for selection at any particular time. An algorithm and process for achieving such simplified and improved algorithm is also presented. As electronic devices such as multifunctional printers continue to combine more and more separate services into the same system, the present invention will lessen confusion and increase user confidence and satisfaction.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multifunctional electronic system having a human interface and offering a plurality of services to a human user, each service having an associated plurality of available system features, at least one of the services being one of print, copy, scan, and facsimile, said system comprising:

a system controller;

a plurality of human controllable switch devices fixedly located on the interface that control selection of system features and that separately communicate with the system controller, the switch devices not being touch screen icons;

a plurality of human interpretable indicators fixedly located on the interface, each of the human interpretable indicators associated with a switch device and indicating the availability of system features associated with the switch device;

wherein, when a first service is selected, the controller directs the human interpretable indicator associated with a switch device to indicate the existence of a first mode for such switch device, the human interpretable indicator associated with the switch device indicating under the first mode a first set of one or more system features that are selectable by the switch device and a first default selection for the switch device, wherein, when a second service is selected, the controller directs the human interpretable indicator associated with the switch device to indicate the existence of a second mode for such switch device, the human interpretable indicator associated with the switch device indicating under the second mode a second set of one or more system features that are selectable by the switch device and a second default selection for the switch device, the first mode and the second mode being different, and wherein the first set of system features that are selectable and the first default selection are visually and differently indicated and the second set of system featuers and the second default selection are visually and differently indicated.

2. The multifunctional system of claim 1, wherein the first service comprises one of the group of services consisting essentially of print, copy, scan, and facsimile and the second service comprises a different one of the group of services consisting essentially of print, copy, scan, and facsimile.

3. The multifunctional system of claim 1, wherein, when the first service is selected, the controller directs the human interpretable indicator associated with a second switch device to indicate the existence of the second mode for such switch device and, when the second service is selected, the controller directs the human interpretable indicator associated with the second switch device to indicate the existence of the first mode for such switch device.

4. The multifunctional system of claim 1, wherein the switch device communicates with the device controller for selection of one of a plurality of system features relating to a service and wherein the first mode comprises the availability of a system feature associated with the switch device and wherein the second mode comprises the unavailability of the feature associated with the switch device.

5. The multifunctional system of claim 4, wherein the switch device comprises one of a group of switch devices;

wherein only one of the group of switch devices may be activated at one time;

wherein, in the first mode, each human interpretable indicator associated with the switch devices in the group indicates the availability of the respective system features associated with the switch devices in the group; and wherein the controller directs one human interpretable indicator associated with a switch device in the group to further indicate that the system feature associated with that switch device is currently selected for activation.

6. The multifunctional system of claim 5, further comprising a second human interpretable indicator associated with each switch device in the group wherein availability of the feature associated with the switch device is indicated by the first human interpretable indicator and wherein a current selection for implementation of the feature is indicated by the second human interpretable indicator.

7. The multifunctional system of claim 6, wherein the first and second human interpretable indicators comprise two levels of illumination.

8. The multifunctional system of claim 6, wherein the first and second human interpretable indicators comprise two sources of illumination.

9. The multifunctional system of claim 6, wherein the human interpretable indicators comprise a single human interpretable indicator that blinks to indicate a selection of a switch.

10. The multifunctional system of claim 1, wherein the human interpretable indicator comprises a source of illumination that provides a first characteristic light to indicate the existence of the first mode and a second characteristic light to indicate the existence of the second mode.

11. The multifunctional system of claim 10, wherein the first characteristic light comprises a blink of light and the second characteristic light comprises a brighter illumination.

12. The multifunctional system of claim 10, wherein the first characteristic light comprises illumination of one color and the second characteristic light comprises illumination of a second color.

13. The multifunctional system of claim 10, wherein the source of illumination comprises a Light Emitting Diode.

14. The multifunctional system of claim 10, wherein the source of illumination comprises an optical fiber.

15. The multifunctional system of claim 1, wherein most switch devices relating to the first service are grouped together on the interface and wherein most switch devices associated with the second service are grouped separately from the group relating to the first service.

16. The multifunctional system of claim 15, further comprising a switch device relating to a plurality of services that is placed on the interface outside of the groups of switch devices related to the first and second services.

17. An electrophotographic multifunctional printer having a human interlace and offering a plurality of services to a human user, each service having an associated plurality of available system features, at least one of the services being one of print, copy, scan, and facsimile, said printer comprising:

a system controller;

a plurality of human controllable switch devices fixedly located on the interface that control selection of system features and that separately communicate with the system controller, the switch devices not being touch screen icons;

a plurality of human interpretable indicators fixedly located on the interface, each of the human interpretable indicators associated with a switch device and indicating the existence of one of a plurality of modes for such switch device;

wherein, when a first service is selected, the controller directs the human interpretable indicator associated with a switch device to indicate the existence of a first mode for such switch device, the human interpretable indicator associated with the switch device indicating under the first mode a first set of one or more system features that are selectable by the switch device and a first default selection for the switch device, wherein, when a second service is selected, the controller directs the human interpretable indicator associated with the switch device to indicate the existence of a second mode for such switch device, the human interpretable indicator associated with the switch device indicating under the second mode a second set of one or more system features that are selectable by the switch device and a second default selection for the switch device, the first mode and the second mode being different, and wherein the first set of system features that are selectable and the first default selection are visually and differently indicated and the second set of system features and the second default selection are visually and differently indicated.

18. In a multifunctional system having a system controller and a human interface, the system offering a plurality of services to a user, each service having an associated plurality of available system features, at least one of the services being one of print, copy, scan, and facsimile, the human interface comprising a plurality of switch devices fixedly located on the interface that control selection of system features, the switch devices not being touch screen icons and a human interpretable indicator fixedly located on the interface and associated with each switch device, a process for interfacing with the system, comprising:

selecting a first service to be performed;

determining, with the controller, which features are available for selection with the first service;

determining, with the controller, which features are the default selections with the first service; and activating, with signals from the controller, the human interpretable indicators associated with those switch devices that control selection of the features available for selection with the first service and activating, with signals from the controller, the human interpretable indicators associated with those switch devices that control selection of the default feature selections, wherein the human interpretable indicators associated with those switch devices visually and differently indicate the features available for selection and the default feature selections.

19. The process of claim 18, further comprising deactivating the human interpretable indicators associated with those switch devices that control selection of features that are not available for selection with the first service.

20. The process of claim 18, further comprising:

selecting a second service to be performed;

determining, with the controller, which features are available for selection with the second service;

activating, with signals from the controller, the human interpretable indicators associated with those switch devices that control selection of the features available for selection with the second service; and deactivating the human interpretable indicators associated with those switch devices that control selection of features that are not available for selection with the second service.

21. The process of claim 18, wherein the default selections of system features will be implemented upon activation of the selected service unless a user selects an alternate feature set by switching at least one switch device.

22. The process of claim 21, further comprising:

selecting an alternative feature set by switching at least one switch device; and highlighting, with a human interpretable indicator, a switch device that controls activation of system processes to implement the selected service.

23. The process of claim 18, further comprising highlighting the human interpretable indicator associated with a switch device that selects a currently selected feature.

24. The process of claim 23, further comprising:

grouping a plurality of switch devices associated with system features available for a selected service wherein only one of the associated features may be selected at one time;

indicating, with human interpretable indicators, the availability of all of the features associated with the switch devices within the group; and highlighting, with a human interpretable indicator, the one of the switch devices within the group that is associated with the currently selected system feature.

25. The multifunctional system of claim 1, wherein the plurality of human controllable switch devices and the plurality of human interpretable indicators remain visible and accessible by a user regardless of a selection of service and an indication of a mode of service.

26. The multifunctional system of claim 1, wherein the plurality of human interpretable indicators: (1) are fixedly located on the interface, (2) are not touch screen icons, and (3) remain visible and accessible by a user regardless of a selection of service and an indication of a mode of service.

* * * * *